United States Patent [19]

Province et al.

[11] 3,828,413
[45] Aug. 13, 1974

[54] PIPE ALIGNMENT DEVICE

[75] Inventors: William F. Province; Wayne E. Cooper, both of Bartlesville, Okla.

[73] Assignee: The Ridge Tool Company, Bartlesville, Okla.

[22] Filed: June 11, 1973

[21] Appl. No.: 368,883

[52] U.S. Cl. ............................................. 29/200 P
[51] Int. Cl. ............................................. B23p 19/00
[58] Field of Search............ 29/200 P, 200 J, 200 R, 29/200 B

[56] References Cited
UNITED STATES PATENTS

| | | | |
|---|---|---|---|
| 3,422,519 | 1/1969 | Fehlman | 29/200 P |
| 3,711,920 | 1/1973 | Simmons, Jr. | 29/200 P |

*Primary Examiner*—Thomas H. Eager
*Attorney, Agent, or Firm*—Head & Johnson

[57] ABSTRACT

This abstract describes improvements in a plastic pipe, thermal joining apparatus, in which two pipe elements are coaxially clamped, the ends faced and heated and then brought together under compression so that as the pipe material cools it will be joined. This improvement is required in those cases where the pipe ends are not completely circular or aligned. Circular track means are provided on the inner faces of the pipe clamping means and jack screw means are provided, to be positioned at different circumferential positions on said track means so that radial forces can be applied to the pipe ends, at any desired azimuthal position, so as to force them into matching contours.

4 Claims, 4 Drawing Figures

PIPE ALIGNMENT DEVICE

BACKGROUND OF THE INVENTION

This invention lies in the field of thermal pipe joining apparatus. More particularly, it is concerned with large diameter pipes wherein the specific contour of the ends of the pipes are matched to each other prior to joining. It concerns specifically means on the pipe joining apparatus by which the contour of the ends of the pipes can be altered by radial forces applied to the outer surfaces of the pipes so that they will match each other and provide an improved joint.

In the prior art thermal pipe joining apparatus normally consists of two pipe holding or clamping means attached to a frame. The pipe clamping means are generally cylindrical means which are hinged into two semicylinders, which can be opened to accept a pipe and then clamped to hold the pipe element securely in a position concentric with the clamp. One clamp is normally made axially movable under some force means so that the pipe section can be moved relative to the other. Thus the two ends can be pressed tightly together after being heated and partially melted, so as to form a secure bond. If the pipes are not completely aligned then the contact between the pipes will not have full strength because the pipe elements will not completely overlap or line up with each other. The present invention is to an improved means of aligning the ends of the pipe.

SUMMARY OF THE INVENTION

It is a primary object of this invention to provide force means that can apply radial forces to the outer surfaces of the pipe ends, while clamped in a pipe joining apparatus, so that the specific contour of the pipe on one end will be matched to that of the other end.

This and other objects are realized and the limitations of the prior art are overcome in this invention by attaching to the inner faces of the two pipe clamping means circular tracks which carry screw jack means that can be positioned at any azimuthal angle along the tracks. These can provide radially inwardly directed forces against selected points on the outer surface of the pipe ends, to alter their shape so as to maintain contours which, on the two ends, match each other.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 1:
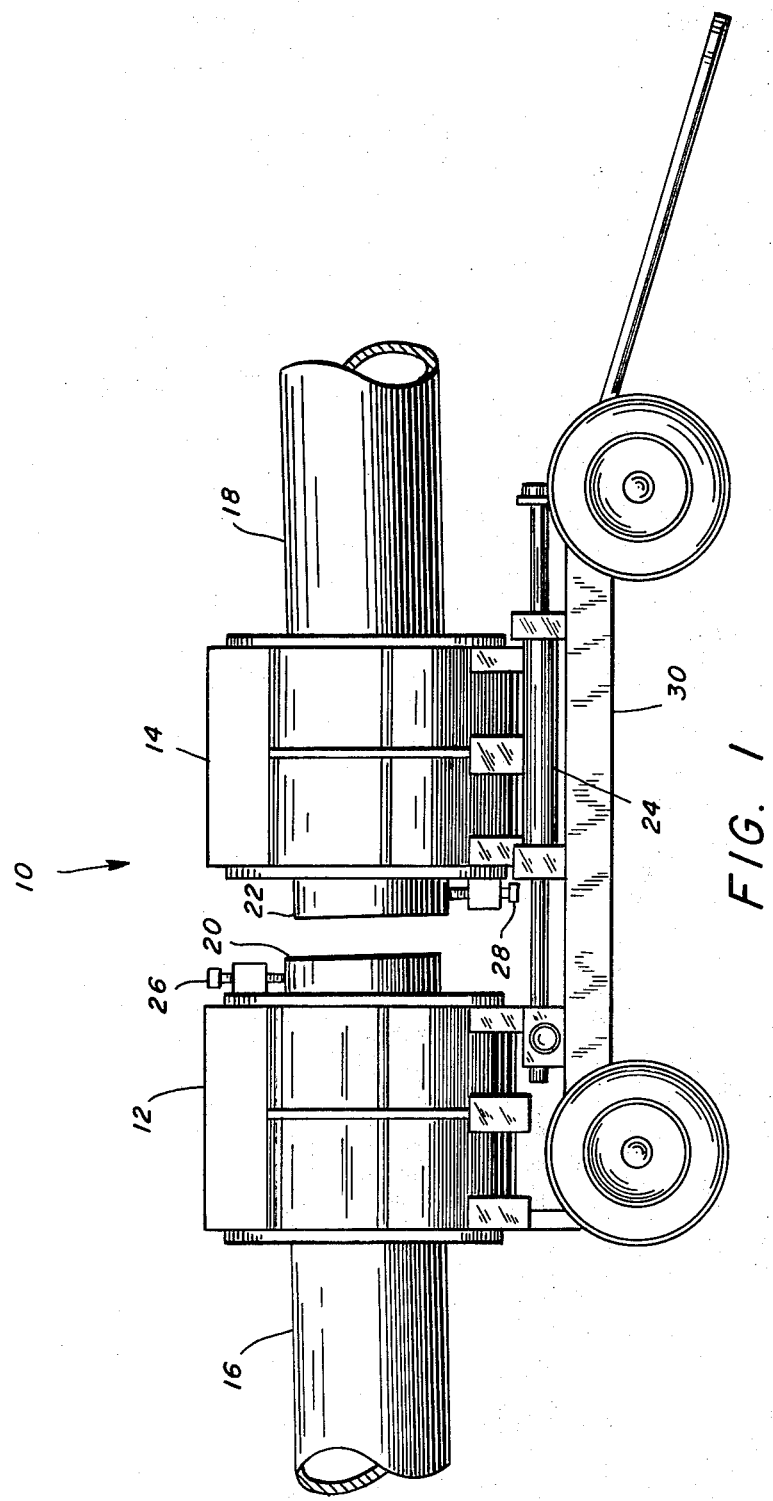
FIG. 1 represents schematically the problem of misalignment of the pipe ends in a thermal pipe joining apparatus.

Referring to FIG. 1 there is shown a conventional type of thermal pipe joining apparatus indicated generally by the numeral 10. It comprises a frame 30 which may be attached to skids, or wheels as shown. It carries two pipe clamping means 12 and 14 one of which, 12, is fixed solidly to the frame and the other 14 is movable by means 24, so as to slide along the axis of the two clamps, so as to carry its pipe element 18 into contact with the pipe element 16 held in the clamp 12.

As shown to an exaggerated scale, the two pipe ends 20 and 22 are misaligned so that if they were to be joined in that condition the pipe ends would not overlap each other completely and therefore, due to the displacement of the pipe ends, the amount of contact between the ends would be less than the thickness of the pipe wall. Therefore, the amount of material which would be bonded and which would carry the tensile strength of the pipe would be less than the maximum possible. Therefore, the pipe joint would not be as strong as it could possibly be if the two pipe ends were completely aligned. Screw means shown simply as 26 and 28 can be provided attached to each of the clamp units 12 and 14 respectively so as to press against the outer surface of the pipe wall at properly azimuthal positions, so as to press the two ends in the proper way so that they will align completely with each other.

Figure 2:
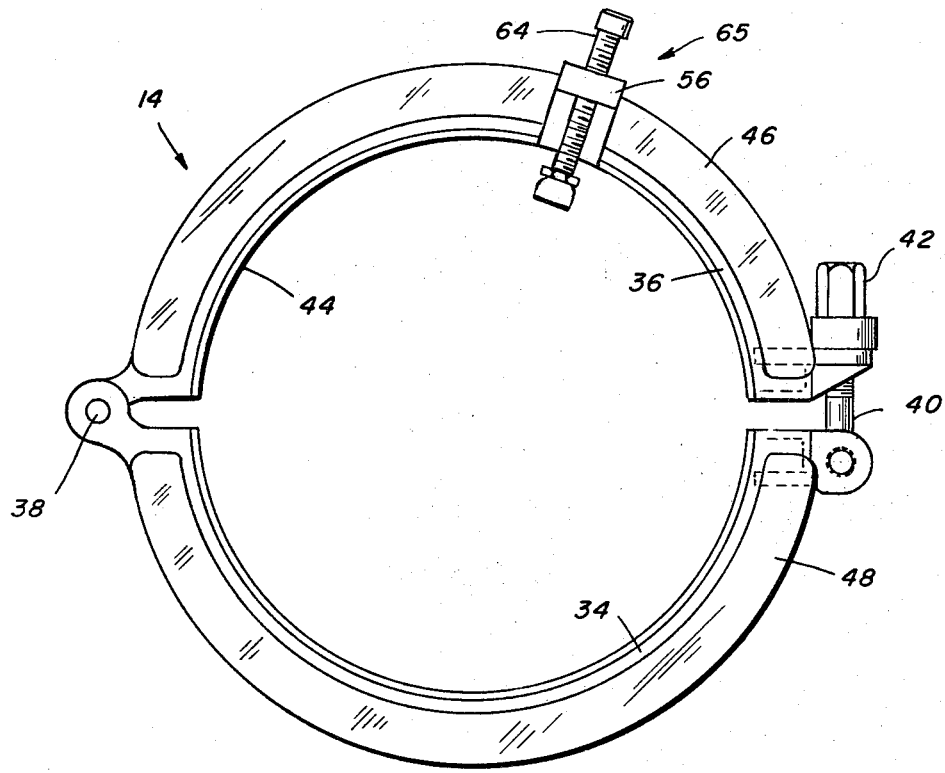
FIGS. 2 and 3 indicate a face-on view and side view of the circular tracks which hold movable jack screws which can be used to press against the surface of the pipe.
Figure 3:
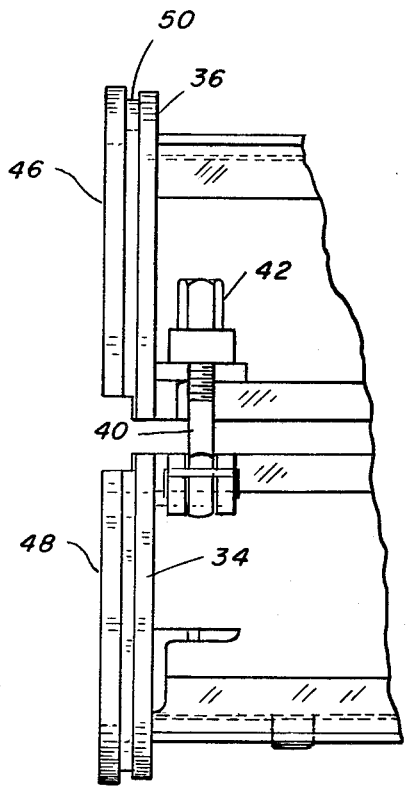
Figure 4:
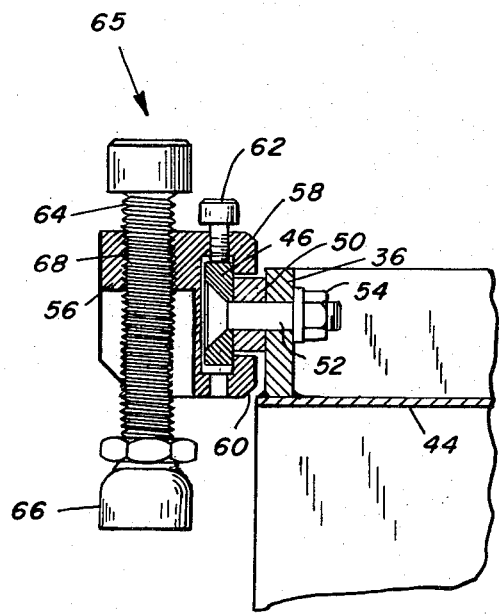
FIG. 4 illustrates details of construction of the tracks and of the jack screws.

In FIGS. 2, 3 and 4 are shown details of the ends of the clamp means 12 and 14 with screw jack means 65 which can be used to press inwardly on the pipe surface. FIG. 2 shows the inner end of the clamp means 14. This comprises two semicylindrical portions 36 and 34 which are hinged together by a hinge in 38 which is parallel to the axis of the pipe, and are clamped together by means of a hinge bolt 40 and nut 42 of which there may be a plurality along the length of the clamping device.

The internal surface 44 is adapted to fit the largest size of pipe which will be used.

In FIG. 3 there is shown a side view of the circular tracks 46 and 48. Track 46 is shown in cross-section in FIG. 4. The track 46 is attached to a narrower support strip 50 and both are attached to the clamping means 36 by means of bolts 52 and nuts 54, for example. If desired, of course, the track 46 can be attached as by welding or by any other desired means.

The force-exerting means or screw jack, indicated generally by the numeral 65, comprises a jack body 56 that fits over the tracks 46 and is held to it by lips 58 and 60. Thus, the jack 65 can be slid circumferentially around the track and as many of them as desired can be positioned on the track. Each jack body is held in the desired azimuthal positions by means of a screw 62. A screw 64 with the attached pressing end 66 is screwed down through the threaded openings 68 in the jack body 56. One screw jack 65 is shown in FIG. 2 and it will be clear that it can be positioned anywhere along the length of the circular track 46. As many of such jacks as desired can be positioned around the circumference of the pipe.

While the force-exerting means or jacks have been shown as screw devices, it will be clear that any other type of force-exerting means, such as hydraulic or pneumatic means, can be used.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a thermal pipe joining device, including a frame, a first pipe clamping means fixed to said frame, a second pipe clamping means, coaxial with said first pipe clamping means and axially moveable along said frame, said first and second clamping means adapted to clamp two pipe elements with abutting ends, in substantially coaxial alignment, the improvement in pipe alignment means, comprising:

a. substantially circular track means attached to the facing surfaces of said first and second clamping means;
   b. at least one force-exerting means on each track adapted to be traversed around said tracks to selected azimuthal positions; and
   c. means to extend said force-exerting means radially inwardly so as to exert a selected force against the outer surface of the abutting end of at least one of said pipes.

2. The pipe alignment means as in claim 1 including a plurality of said force-exerting means on said tracks.

3. The pipe alignment means as in claim 1 in which said force-exerting means are screw jack means.

4. The pipe alignment means as in claim 1 including means to clamp said force-exerting means to said tracks.

* * * * *